United States Patent
Zhou et al.

(10) Patent No.: US 9,448,676 B2
(45) Date of Patent: Sep. 20, 2016

(54) TOUCH DISPLAY DRIVING CIRCUIT, DRIVING METHOD AND DISPLAY DEVICE

(71) Applicants: BOE Technology Group Co., Ltd., Beijing (CN); Chengdu BOE Optoelectronics Technology Co., Ltd., Chengdu, Sichuan Province (CN)

(72) Inventors: Quanguo Zhou, Beijing (CN); Xiaojing Qi, Beijing (CN)

(73) Assignees: BOE Technology Group Co., Ltd., Beijing (CN); Chengdu BOE Optoelectronics Technology Co., Ltd., Chengdu, Sichuan (CN)

( * ) Notice: Subject to any disclaimer, the term of this patent is extended or adjusted under 35 U.S.C. 154(b) by 33 days.

(21) Appl. No.: 14/361,897

(22) PCT Filed: Dec. 16, 2013

(86) PCT No.: PCT/CN2013/089555
§ 371 (c)(1),
(2) Date: May 30, 2014

(87) PCT Pub. No.: WO2015/003465
PCT Pub. Date: Jan. 15, 2015

(65) Prior Publication Data
US 2015/0193045 A1 Jul. 9, 2015

(30) Foreign Application Priority Data
Jul. 9, 2013 (CN) .......................... 2013 1 0286978

(51) Int. Cl.
*G06F 3/045* (2006.01)
*G06F 3/044* (2006.01)
(Continued)

(52) U.S. Cl.
CPC .............. *G06F 3/044* (2013.01); *G06F 3/041* (2013.01); *G06F 3/0412* (2013.01); *G09G 3/32* (2013.01); *G09G 3/3233* (2013.01); *G09G 2300/0861* (2013.01); *G09G 2354/00* (2013.01)

(58) Field of Classification Search
None
See application file for complete search history.

(56) References Cited

U.S. PATENT DOCUMENTS

2005/0007353 A1   1/2005   Smith et al.
(Continued)

FOREIGN PATENT DOCUMENTS

| CN | 1697007 A | 11/2005 |
|---|---|---|
| CN | 102236187 A | 11/2011 |

(Continued)

OTHER PUBLICATIONS

Notification of the First Office Action from the Chinese Patent Office (SIPO) issued for priority Chinese application 201310286978.4 dated Dec. 3, 2014 with English translation.
(Continued)

*Primary Examiner* — Srilakshmi K Kumar
*Assistant Examiner* — Stephen T Reed
(74) *Attorney, Agent, or Firm* — Frommer Lawrence & Haug LLP (57) ABSTRACT

The present invention provides a touch display driving circuit, a driving method and a display device. The touch display driving circuit comprises a data writing control unit, a storage unit, a touch sensing unit, a driving compensation control unit, a driving unit, a light-emitting control unit and a light-emitting unit. The data writing control unit is used for controlling a voltage signal of a data line, the storage unit is used for providing a voltage for the driving unit, the light-emitting, control unit is used for controlling the light-emitting unit, the driving unit is used for providing a touch detecting current and a driving current, the driving compensation control unit is used for compensating a voltage value of the storage unit, and the touch sensing unit is used for outputting the touch detecting current and changing the voltage value of the storage unit.

18 Claims, 8 Drawing Sheets

(51) Int. Cl.
*G06F 3/041* (2006.01)
*G09G 3/32* (2016.01)

(56) References Cited

U.S. PATENT DOCUMENTS

| | | | |
|---|---|---|---|
| 2006/0262331 A1* | 11/2006 | Ikeda | G06K 15/1219 358/1.7 |
| 2009/0027310 A1* | 1/2009 | Kim | G09G 3/3233 345/76 |
| 2010/0164847 A1* | 7/2010 | Lee | G09G 3/3233 345/77 |
| 2011/0001711 A1* | 1/2011 | Choi | G06F 3/042 345/173 |
| 2011/0109660 A1* | 5/2011 | Kim | G09G 3/3233 345/690 |
| 2011/0122096 A1 | 5/2011 | Kim et al. | |

FOREIGN PATENT DOCUMENTS

| | | |
|---|---|---|
| CN | 102298227 A | 12/2011 |
| CN | 102541349 A | 7/2012 |
| CN | 103135846 A | 6/2013 |
| CN | 103325343 A | 9/2013 |
| CN | 103383837 A | 11/2013 |
| CN | 203366702 U | 12/2013 |

OTHER PUBLICATIONS

Notification of the Second Office Action from the Chinese Patent Office (SIPO) issued for priority Chinese application 201310286978.4 mailed Feb. 28, 2015.

Written Opinion of the International Searching Authority (SIPO) issued for international application PCT/CN2013/089555 mailed Apr. 22, 2014, English translation.

* cited by examiner

TOUCH DISPLAY DRIVING CIRCUIT, DRIVING METHOD AND DISPLAY DEVICE

This application is a 371 of PCT/CN2013/089555 filed on Dec. 16, 2013, which claims priority benefits from Chinese Patent Application Number 201310286978.4 filed Jul. 9, 2013, the disclosure of which is incorporated herein by reference.

FIELD OF THE INVENTION

The present invention relates to the field of display technology, and particularly relates to a touch display driving circuit, a driving method and a display device.

BACKGROUND OF THE INVENTION

Touch screens have gained more and more attention in the market of consumer electronics. At present, the touch screens have been widely applied to portable electronic devices, such as mobile phone screens, notebook computers; digital cameras and the like as human-machine interaction interfaces. The touch screens may be classified into two types, namely external touch screens and in-cell touch screens according to techniques. The external touch screens are formed by arranging touch devices outside display surfaces of display panels, and have been widely applied to mobile phones and other mobile application products. However, the external touch screens have relatively high costs and relatively great thickness. When the touch screens need to be made larger and larger, the above two shortcomings become more and more apparent. At present, the consumer electronics, such as mobile phones, tablet computers and the like, are required to have smaller size, thinner thickness and lighter weight. As in-cell touch screens are integrated in the display panels, the above two shortcomings may be well overcome.

The applications of an active matrix organic light emitting diode (referred to as AMOLED) have become more and more important. A pixel display device of the AMOLED is an organic light-emitting diode (hereinafter referred to as OLED), which can emit light, this is because a driving thin film transistor (TFT), in a saturated state, produces driving current, which drives the OLED to emit light. At present, a driving circuit of the AMOLED generally adopts a traditional 2T1C circuit, and the 2T1C circuit comprises two TFTs and one storage capacitor.

The inventor found that at least the following problems exist in the prior art: the traditional 2T1C circuit can only perform OLED driving display, has no function of in-cell touch, and cannot realize integration of in-cell touch detection and OLED driving display, which increases the thickness of the display screen.

SUMMARY OF THE INVENTION

The present invention provides a touch display driving circuit, a driving method and a display device, which may realize integration of touch detection and pixel display and reduce the thickness of a display screen.

In order to realize the above objectives, the present invention provides a touch display driving circuit, which comprises a data writing control unit, a storage unit, a touch sensing unit, a driving compensation control unit, a driving unit, a light-emitting control unit and a light-emitting unit, wherein, the data writing control unit is used for controlling a voltage signal of a data line to be written into the storage unit;

the storage unit is used for providing a voltage for the driving unit;

the light-emitting control unit is used for controlling the light-emitting unit to emit light;

the driving unit is used for providing a touch detecting current in a touch detecting stage and providing a driving current for the light-emitting unit in a light-emitting stage;

the driving compensation control unit is used for compensating a voltage value of the storage unit; and the touch sensing unit is used for outputting the touch detecting current in the touch detecting stage and changing the voltage value of the storage unit when no touch occurs in the touch detecting stage.

Optionally, the data writing control unit is connected with the storage unit through a second node; the storage unit is connected with the driving unit through a first node; the driving unit is connected with the light-emitting control unit through a fourth node; the light-emitting control unit is connected with the light-emitting unit through a fifth node; the driving compensation control unit is connected with both ends of the storage unit through the first node and the second node, respectively; the driving compensation control unit is connected with the driving unit through the first node and the fourth node, respectively; and the touch sensing unit is connected with the driving unit through a third node, the first node and the fourth node, respectively.

Optionally, the data writing control unit comprises a sixth switching tube, a gate of the sixth switching tube is connected with a scanning line, a first electrode of the sixth switching tube is connected with the data line, and a second electrode of the sixth switching tube is connected with the second node.

Optionally, the storage unit comprises a storage capacitor, a first end of the storage capacitor is connected with the second node, and a second end of the storage capacitor is connected with the first node.

Optionally, the driving unit comprises a driving transistor, a gate of the driving transistor is connected with the first node, a first electrode of the driving transistor is connected with the third node, and a second electrode of the driving transistor is connected with the fourth node.

Optionally, the light-emitting control unit comprises a first switching tube, a gate of the first switching tube is connected with a third control line, the first electrode of the first switching tube is connected with the fourth node, and the second electrode of the first switching tube is connected with the fifth node.

Optionally, the light-emitting unit comprises an OLED, one end of the OLED is connected with the fifth node, and the other end of the OLED is connected with a second power supply.

Optionally, the driving compensation control unit comprises a fourth switching tube and a seventh switching tube; a gate of the fourth switching tube is connected with a second control line, a first electrode of the fourth switching tube is connected with the first node, and a second electrode of the fourth switching tube is connected with the fourth node; and a gate of the seventh switching tube is connected with the second control line, a first electrode of the seventh switching tube is connected with the second node, and a second electrode of the seventh switching tube is connected with a second power supply.

Optionally, the touch sensing unit comprises a photoelectric diode, a third switching tube and a fifth switching tube;

a first electrode of the photoelectric diode is connected with a first power supply and the third node, and a second electrode of the photoelectric diode is connected with the first electrode of the fifth switching tube;

a gate of the fifth switching tube is connected with a first control line, and a second electrode of the fifth switching tube is connected with the first node; and a gate of the third switching tube is connected with the first control line, a first electrode of the third switching tube is connected with the fourth node, and a second electrode of the third switching tube is connected with a reading line.

In order to realize the above objectives, the present invention provides a display device comprising the above-described touch display driving circuit.

In order to realize the above objectives, the present invention provides a touch display driving method, which is based on a touch display driving circuit comprising a data writing control unit, a storage unit, a touch sensing unit, a driving compensation control unit, a driving unit, a light-emitting control unit and a light-emitting unit;

the touch display driving method comprising:

a touch detecting stage: initializing the storage unit by the driving compensation control unit; writing a voltage signal of a data line into the storage unit by the data writing control unit; disconnecting the light-emitting unit from the driving unit by the light-emitting control unit, changing a voltage of the storage unit by the touch sensing unit when no touch occurs, providing a touch detecting current by the driving unit according to a voltage value of the storage unit, and outputting the touch detecting current by the touch sensing unit; and a light-emitting stage: initializing the storage unit by the driving compensation control unit; writing a voltage signal of a data line into the storage unit by the data writing control unit; and connecting the light-emitting unit with the driving unit by the light-emitting control unit, and providing a driving current for the light-emitting unit by the driving unit according to a voltage value of the storage unit.

Optionally, the data writing control unit comprises a sixth switching tube, a first electrode of the sixth switching tube is connected with the data line, and a second electrode of the sixth switching tube is connected with a second node;

the storage unit comprises a storage capacitor, a first end of the storage capacitor is connected with the second node, and a second end of the storage capacitor is connected with a first node;

the driving unit comprises a driving transistor, a gate of the driving transistor is connected with the first node, a first electrode of the driving transistor is connected with a third node, and a second electrode of the driving transistor is connected with a fourth node;

the light-emitting control unit comprises a first switching tube, a first electrode of the first switching tube is connected with the fourth node, and a second electrode of the first switching tube is connected with a fifth node;

the light-emitting unit comprises an OLED, one end of the OLED is connected with the fifth node, and the other end of the OLED is connected with a second power supply;

the driving compensation control unit comprises a fourth switching tube and a seventh switching tube; a first electrode of the fourth switching tube is connected with the first node, and a second electrode of the fourth switching tube is connected with the fourth node; and a first electrode of the seventh switching tube is connected with the second node, and a second electrode of the seventh switching tube is connected with the second power supply;

the touch sensing unit comprises a photoelectric diode, a third switching tube and a fifth switching tube; a first electrode of the photoelectric diode is connected with a first power supply and the third node, and a second electrode of the photoelectric diode is connected with a first electrode of the fifth switching tube; a second electrode of the fifth switching tube is connected with the second node; and a first electrode of the third switching tube is connected with the fourth node, and a second electrode of the third switching tube is connected with a reading line;

the touch detecting stage specifically comprises:

a touch sensing initialization phase: turning on the fourth switching tube and the seventh switching tube, charging the first end of the storage capacitor through the seventh switching tube by the second power supply, turning on the driving transistor, and charging the second end of the storage capacitor through the driving transistor and the fourth switching tube by the first power supply till the driving transistor is turned off;

a touch sensing data writing phase: turning on the sixth switching tube, and writing the voltage signal of the data line into the second end of the storage capacitor through the first end of the storage capacitor and the storage capacitor; and a touch detection phase: turning off the first switching tube, turning on the third switching tube and the fifth switching tube, reducing a voltage at the second end of the storage capacitor through the fifth switching tube by a leakage current of the photoelectric diode when no touch occurs, and reading detecting a current of the driving transistor through the third switching tube by the reading line;

the light-emitting stage specifically comprises:

a driving display initialization phase: turning on the fourth switching tube and the seventh switching tube, charging the first end of the storage capacitor through the seventh switching tube by the second power supply, turning on the driving transistor, and charging the second end of the storage capacitor through the driving transistor and the fourth switching tube by the first power supply till the driving transistor is turned off;

a driving display data writing phase: turning on the sixth switching tube, and writing the voltage signal of the data line into the second end of the storage capacitor through the first end of the storage capacitor and the storage capacitor; and a pixel display phase: turning on the firth switching tube, turning off the third switching tube and the fifth switching tube, and driving the OLED to emit light through the first switching tube by a current of the driving transistor.

Further optionally, a gate of the sixth switching tube is connected with a scanning line;

a gate of the first switching tube is connected with a third control line;

a gate of the fourth switching tube and a gate of the seventh switching tube are connected with a second control line;

a gate of the fifth switching tube and a gate of the third switching tube are connected with a first control line;

the first switching tube, the third switching tube, the fourth switching tube, the fifth switching tube, the sixth switching tube, the seventh switching tube and the driving transistor are P type thin film transistors;

the first power supply is at a high level, and the second power supply is at a low level;

the touch detecting stage specifically comprises:

a touch sensing initialization phase: applying a high level to the scanning line, the data line, the first control line and the third control line, and applying a low level to the second control line;

a touch sensing and data writing phase: applying a high level to the first control line, the second control line and the third control line, and applying a low level to the scanning line and the data line; and a touch detecting phase: applying a high level to the scanning line, the data line, the second control line and the third control line, and applying a low level to the first control line;

the light-emitting stage specifically comprises:

a driving display initialization phase: applying the high level to the scanning line, the data line, the first control line and the third control line, and applying the low level to the second control line;

a driving display and data writing phase: applying the high level to the first control line, the second control line and the third control line, and applying the low level to the scanning line and the data line; and a pixel display phase: applying the high level to the scanning line, the data line, the first control line and the second control line, and applying the low level to the third control line.

The present invention provides the touch display driving circuit, the driving method and the display device, and the touch display driving circuit comprises the data writing control unit, the storage unit, the touch sensing unit, the driving compensation control unit, the driving unit, the light-emitting control unit and the light-emitting unit, wherein the data writing control unit is used for controlling a voltage signal of the data line to be written into the storage unit; the storage unit is used for providing a voltage for the driving unit; the light-emitting control unit is used for controlling the light-emitting unit to emit light; the driving unit is used for providing a touch detecting current in a touch detecting stage and providing a driving current for the light-emitting unit in a light-emitting stage; the driving compensation control unit is used for compensating a voltage value of the storage unit; and the touch sensing unit is used for outputting the touch detecting current in the touch detecting stage and changing the voltage value of the storage unit when no touch occurs in the touch detecting stage. The technical solution of the present invention may realize the integration of touch detection and pixel display and reduce the thickness of the display screen.

DETAILED DESCRIPTION OF THE EMBODIMENTS

In order to make those skilled in the art better understand the technical solution of the present invention, a touch display driving circuit, a driving method and a display device provided by the present invention are further described in detail in combination with the accompanying drawings below.

Figure 1:
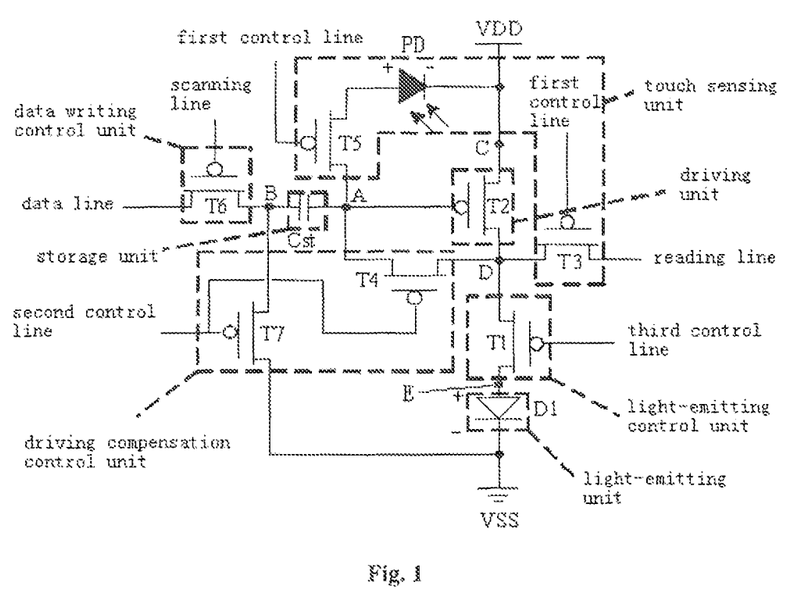
FIG. 1 is a structure schematic diagram of a touch display driving circuit provided by an embodiment of the present invention.

FIG. 1 is a structure schematic diagram of a touch display driving circuit provided by the embodiment of the present invention. As shown in FIG. 1, the touch display driving circuit comprises a data writing control unit, a storage unit, a touch sensing unit, a driving compensation control unit, a driving unit, a light-emitting control unit and a light-emitting unit, wherein the data writing control unit is used for controlling a voltage signal of a data line to be written into the storage unit; the storage unit is used for providing a voltage for the driving unit; the light-emitting control unit is used for controlling the light-emitting unit to emit light; the driving unit is used for providing a touch detecting current in a touch detecting stage and providing a driving current for the light-emitting unit in a light-emitting stage; the driving compensation control unit is used for compensating a voltage value of the storage unit; and the touch sensing unit is used for outputting the touch detecting current in the touch detecting stage and changing the voltage value of the storage unit when no touch occurs in the touch detecting stage.

Preferably, the data writing control unit is connected with the storage unit through a second node B; the storage unit is connected with the driving unit through a first node A; the driving unit is connected with the light-emitting control unit through a fourth node D; the light-emitting control unit is connected with the light-emitting unit through a fifth node E; the driving compensation control unit is connected with both ends of the storage unit through the first node A and the second node B, respectively; the driving compensation control unit is connected with the driving unit through the first node A and the fourth node D, respectively; and the touch sensing unit is connected with the driving unit through a third node C, the first node A and the fourth node D, respectively.

In this embodiment, preferably, the data writing control unit comprises a sixth switching tube T6; the storage unit comprises a storage capacitor Cst; the driving unit comprises a driving transistor T2; the light-emitting control unit comprises a first switching tube T1; the light-emitting unit comprises an OLED D1; the driving compensation control unit comprises a fourth switching tube T4 and a seventh switching tube T7; and the touch sensing unit comprises a photoelectric diode, a third switching tube T3 and a fifth switching tube T5. In the embodiment, the photoelectric diode is PD (referred to as PD).

Specifically, a gate of the sixth switching tube T6 is connected with a scanning line, a first electrode of the sixth switching tube T6 is connected with a data line, and a second electrode of the sixth switching tube T6 is connected with the second node; a first end of the storage capacitor Cst is connected with the second node B, and a second end of the storage capacitor Cst is connected with the first node A; a gate of the driving transistor T2 is connected with the first node A, a first electrode of the driving transistor T2 is connected with the third node C, and a second electrode of the driving transistor T2 is connected with the fourth node D; a gate of the first switching tube T1 is connected with a third control line, a first electrode of the first switching tube T1 is connected with the fourth node D, and a second electrode of the first switching tube T1 is connected with the fifth node B; one end of the OLED D1 is connected with the fifth node E, and the other end of the OLED D1 is connected with a second power supply VSS; a gate of the tour switching tube T4 is connected with a gate of the seventh switching tube T7 and a second control line that is, both the gate of the fourth switching tube T4 and the gate of the seventh switching tube T7 are connected with the second control line), and a first electrode of the fourth switching tube T4 is connected with the first node A; a second electrode of the fourth switching tube T4 is connected with the fourth node D; and the gate of the seventh switching tube T7 is connected with the second control line (which may also be connected with the gate of the fourth switching tube T4), a first electrode of the seventh switching tube T7 is connected with the second node B, and a second electrode of the seventh switching tube T7 is connected with the second power supply VSS. A first electrode of the photoelectric diode PD is connected with a first power supply VDD and the third node C. A second electrode of the photoelectric diode PD is connected with a first electrode of the fifth switching tube T5, a gate of the fifth switching tube T5 is connected with a first control line, and a second electrode of the fifth switching tube T5 is connected with the first node A; and a gate of the third switching tube T3 is connected with the first control line, a first electrode of the third switching tube T3 is connected with the fourth node D, and a second electrode of the third switching tube T3 is connected with a reading line.

In the embodiment, the first power supply provides a voltage of VDD, the second power supply provides a reference voltage VSS. Preferably, the voltage VDD from the first power supply is at a high level, and correspondingly, the voltage VSS from the second power supply as the reference voltage is at a low level. The first electrode of the driving transistor T2 is connected with the first power supply VDD, a cathode of the photoelectric diode PD is connected with the first power supply VDD, the cathode of the OLED D1 is connected with the second power supply VSS. The first switching tube T1, the third switching tube T3, the fourth switching tube T4, the fifth switching tube T5, the sixth switching tube T6, the seventh switching tube T7 and the driving transistor T2 are P type TFTs.

In this case, a P type TFT refers to a TFT that when the gate is at a low level, conduction between the first electrode and the second electrode of the TFT is realized (namely, the TFT is turned on); and when the gate is at a high level, conduction between the first electrode and the second electrode of the TFT is prohibited (namely, the TFT is turned off).

Figure 2:
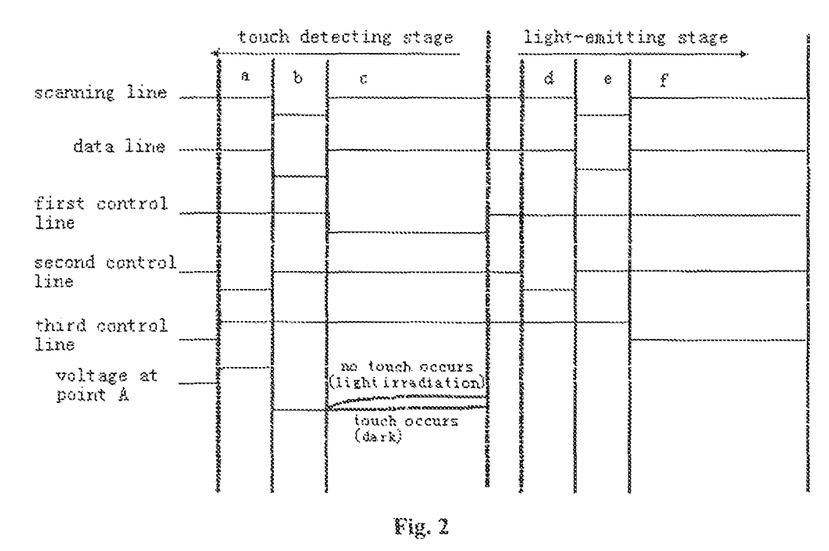
FIG. 2 is a schematic diagram of input voltages of the touch display driving circuit in the embodiment of the present invention.
Figure 3:
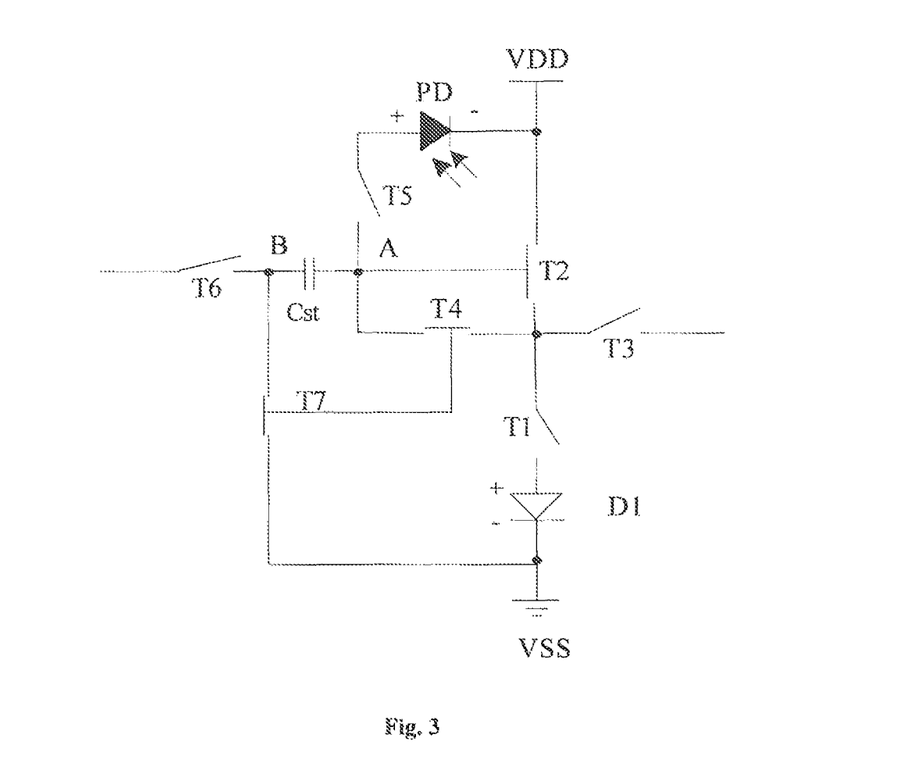
FIG. 3 is an equivalent circuit diagram of the touch display driving circuit in the embodiment of the present invention in a touch sensing initialization phase.

The working process of the touch display driving circuit in this embodiment is described in detail below in combination with FIGS. 2-8. FIG. 2 is a schematic diagram of input voltages of the touch display driving circuit in the embodiment. The working process can be divided into two major stages according to time sequence: a touch detecting control stage and a light-emitting stage, and each stage can be further divided into three small phases, wherein a is a touch sensing initialization phase, b is a touch sensing and data writing phase, c is a touch detecting phase, d is a driving display initialization phase, e is a driving display and data writing phase and f is a pixel display phase. FIG. 3 is an equivalent circuit diagram of the touch display driving circuit in the embodiment in the touch sensing initialization stage phase. As shown in FIGS. 2 and 3, in the touch sensing initialization phase a, the voltages applied to the data line and the scanning line are at high levels, the voltage applied to the first control line is at a high level, the voltage applied to the second control line is at a tow level, and the voltage applied to the third control line is at a high level. At this time, the first switching tube T1, the third switching tube T3, the fifth switching tube T5 and the sixth switching tube T6 are turned off, the fourth switching tube T4 and the seventh switching tube T7 are turned on, therefore, the equivalent circuit schematic diagram of the touch display driving circuit in FIG. 1 is as shown in FIG. 3. At this time, the voltage applied to the second power supply VSS charges the second node B through the seventh switching tube T7 and simultaneously charges the storage capacitor Cst, a coupling voltage is produced at the first node A, the driving transistor T2 is turned on, the first power supply VDD charges the first node A, the gate voltage $V_{GT2}$ of the driving transistor T2 is equivalent to the voltage $V_A$ of the first node A, namely $V_{GT2}=V_A=VDD-V_{th}$, wherein $V_{th}$ is the threshold voltage of the driving transistor T2, at this time, the driving transistor T2 is turned off, and the first power supply VDD stops charging the first node A.

Figure 4:
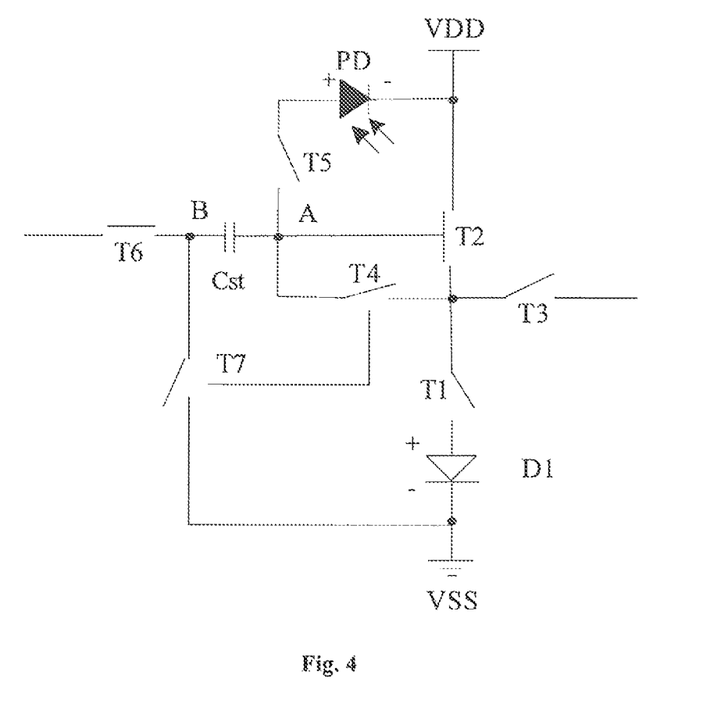
FIG. 4 is an equivalent circuit diagram of the touch display driving circuit in the embodiment of the present invention in a touch sensing and data writing phase.

FIG. 4 is an equivalent circuit schematic diagram of the touch display driving circuit in the embodiment in the touch sensing and data writing phase, as shown in FIGS. 2 and 4, in the data writing phase b of the touch sensing stage, the voltage applied to the data line and the scanning line is at a low level, the voltage applied to the first control line is at a high level, the voltage applied to the second control line is at a high level, and the voltage applied to the third control line is at a high level. At this time, the first switching tube T1, the third switching tube T3, the fourth switching tube T4, the fifth switching tube T5 and the seventh switching tube T7 are turned off, the sixth switching tube T6 is turned on, therefore, the equivalent circuit schematic diagram of the touch display driving circuit in FIG. 1 is as shown in FIG. 4, the voltage applied to the data line and the scanning line is written into the first node A via the sixth switching tube T6 and the storage capacitor Cst. At this time, the first node A is floating without charge transfer, the voltage increment of the first node A should be equivalent to that of the second node B, namely $\Delta V_B=V_{data}$, thus the voltage of the first node A is $V_A=V_{data}+VDD-V_{th}$, wherein $V_{data}$ is the voltage applied to the data line.

Figure 5:
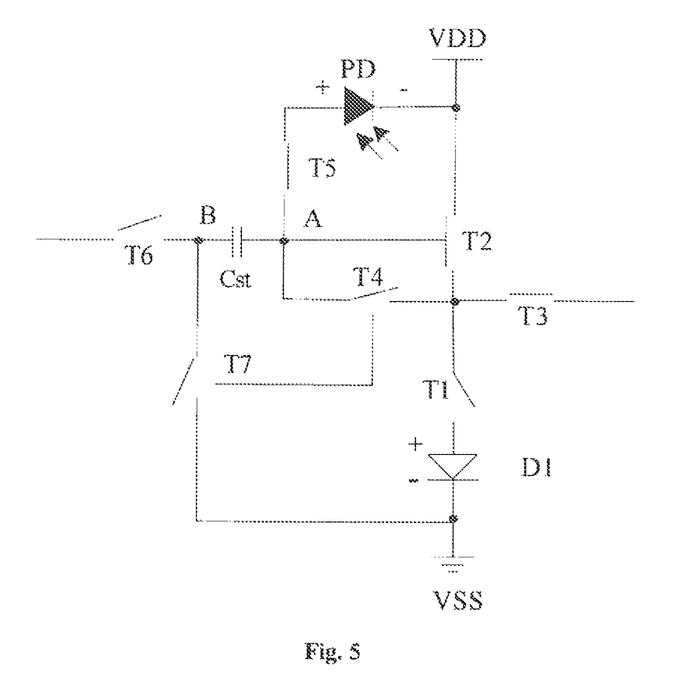
FIG. 5 is an equivalent circuit diagram of the touch display driving circuit in the embodiment of the present invention in a touch detecting phase.

FIG. 5 is an equivalent circuit schematic diagram of the touch display driving circuit in the embodiment in the touch detecting phase, as shown in FIGS. 2 and 5, in the touch detecting phase c, the voltage applied to the data line and the scanning line is at a high level, the voltage applied to the first control line is at a low level, the voltage applied to the second control line is at a high level, and the voltage applied to the third control line is at a high level. At this time, the first switching tube T1, the fourth switching tube T4, the sixth switching tube T6 and the seventh switching tube T7 are turned off, the third switching tube T3 and the fifth switching tube T5 are turned on, thus the equivalent circuit schematic diagram of the touch display driving circuit in FIG. 1 is as shown in FIG. 5, the voltage of the first node A maintains unchanged and is $V_A=V_{data}+VDD-V_{th}$, in this phase, a touch detecting current is output from the first power supply VDD by the reading line via the driving transistor T2 and the third switching tube T3, and its intensity is controlled by the voltage at the gate of the driving transistor T2 (i.e., the voltage of the storage capacitor Cst). Here, if no touch occurs, external light may irradiate onto the photoelectric diode PD, the photoelectric diode PD may produce a relatively large leakage current when being irradiated by light, and charges on the storage capacitor Cst are rapidly reduced due to the leakage current produced by the photoelectric diode PD due to light irradiation, resulting in greatly reduced voltage of the first node, which further causes the current flowing through the driving transistor T2 (the touch detecting current) to be reduced rapidly. Correspondingly, if a touch occurs, the external light is shielded by the touch (for example, a finger) and cannot irradiate onto the photoelectric diode PD, no current exists in the photoelectric diode PD (or extremely small dark current exists, but the situation may be appropriately considered as no current), the charges on the storage capacitor Cst maintain unchanged, the voltage of the first node A is also unchanged, and the current flowing trough the driving transistor T2 (the touch detecting current) maintains stable. Therefore, by detecting and analyzing the touch detecting current flowing through the reading line (analyzing whether the current is reduced obviously or not) through an external driving circuit, it can be judged whether touch occurs or not.

Figure 6:
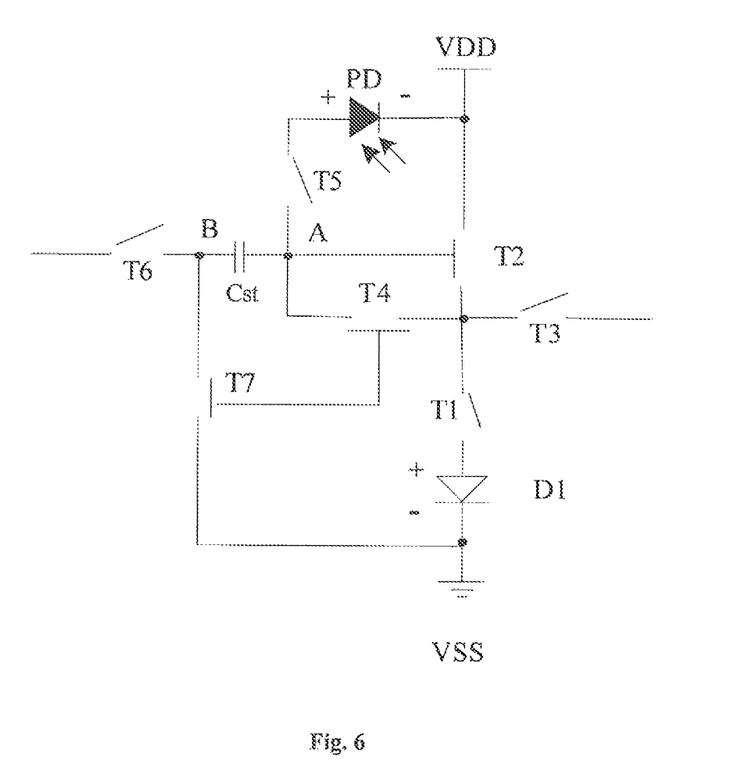
FIG. 6 is an equivalent circuit diagram of the touch display driving circuit in the embodiment of the present invention in a driving display initialization phase.

FIG. 6 is an equivalent circuit schematic diagram of the touch display driving circuit in the embodiment in the driving display initialization phase, as shown in FIGS. 2 and 6, in the driving display initialization phase d, the voltage applied to the data line and the scanning line is at a high level, the voltage applied to the first control line is at a high level, the voltage applied to the second control line is at a low level, and the voltage applied to the third control line is at a high level. At this time, the first switching tube T1, the third switching tube T3, the fifth switching tube T5 and the sixth switching tube T6 are turned off, the fourth switching tube T4 and the seventh switching tube T7 are turned on, at this time, the driving transistor T2 is a diode, the equivalent circuit schematic diagram of the touch display driving circuit in FIG. 1 is as shown in FIG. 6, the voltage provided by the second power supply VSS charges the second node B through the seventh switching tube T7, the first node A produces a coupling voltage to turn on the driving transistor T2, the first power supply VDD charges the first node A through the driving transistor T2 and the fourth switching tube T4, when the gate voltage $V_{GT2}$ of the driving transistor T2 is equivalent to the voltage $V_A$ of the first node A, namely, $V_{GT2}=V_A=VDD-V_{th}$, the first power supply VDD stops charging the first node A.

Figure 7:
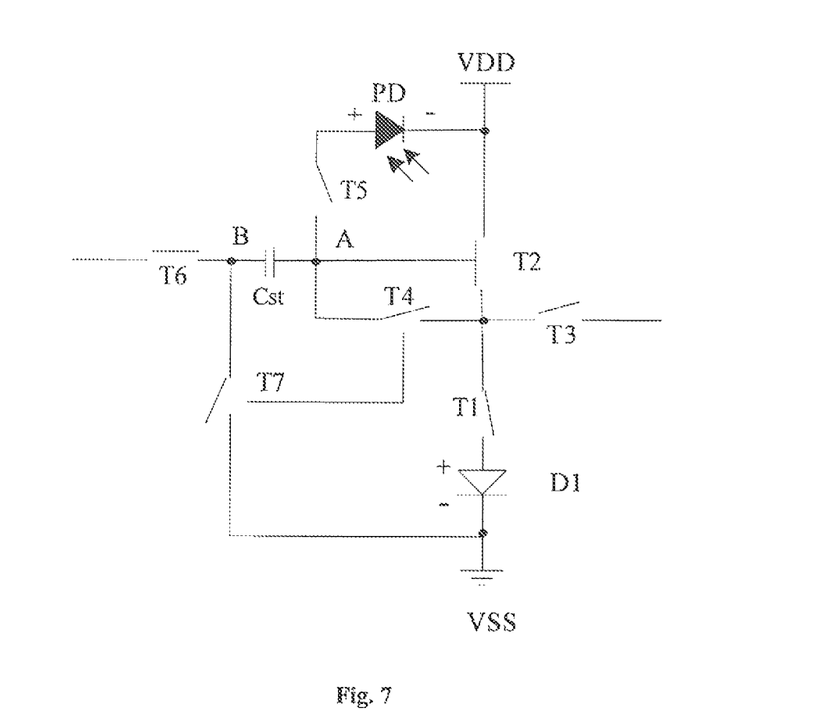
FIG. 7 is an equivalent circuit diagram of the touch display driving circuit in the embodiment of the present invention in a driving display and data writing phase.

FIG. 7 is an equivalent circuit schematic diagram of the touch display driving circuit in the embodiment in the driving display and data writing phase, as shown in FIGS. 2 and 7, in the driving display and data writing phase e, the voltage applied to the data line and the scanning line is at a low level, the voltage applied to the first control line is at a high level, the voltage applied to the second control line is at a high level, the voltage applied to the third control line is at a high level. At this time, the first switching tube T1, the third switching tube T3, the fourth switching tube T4, the fifth switching tube T5 and the seventh switching tube T7 are turned off, the sixth switching tube T6 is turned on, the equivalent circuit schematic diagram of the touch display driving circuit in FIG. 1 is as shown in FIG. 7, the voltage applied to the data line is written into the first node A via the sixth switching tube T6 and the storage capacitor Cst, the first node A is floating without charge transfer, and the voltage increment of the first node A should be equal to that of the second node B, namely $\Delta VB=V_{data}$, thus the voltage of the first node A is $V_A=V_{data}+VDD-V_{th}$.

Figure 8:
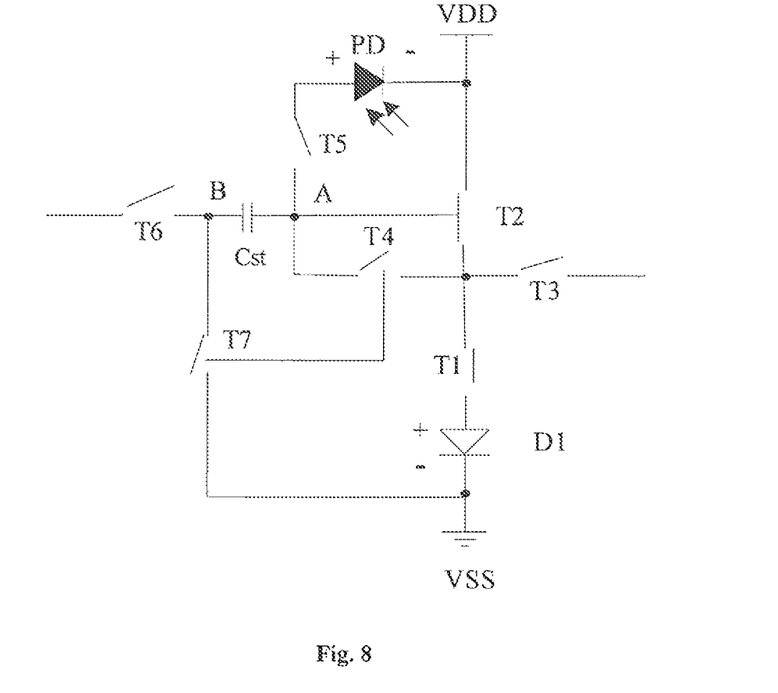
FIG. 8 is an equivalent circuit diagram of the touch display driving circuit in the embodiment of the present invention in a pixel display phase.

FIG. 8 is an equivalent circuit schematic diagram of the touch display driving circuit in the embodiment in the pixel display phase, as shown in FIGS. 2 and 8, the voltage applied to the data line and the scanning line is at a high level, the voltage applied to the first control line is at a high level, the voltage applied to the second control line is at a high level, the voltage applied to the third control line is at a low level. At this time, the third switching tube T3, the fourth switching tube T4, the fifth switching tube T5, the sixth switching tube T6 and the seventh switching tube T7 are turned off, the first switching tube T1 is turned on, the equivalent circuit schematic diagram of the touch display driving circuit in FIG. 1 is as shown in FIG. 8, the gate voltage of the driving transistor T2 is equal to the voltage of the first node A, namely $V_{GT2}=V_A=V_{data}+VDD-V_{th}$, at this time, the current flowing through the driving transistor T2 is: $I=K(V_{sg}-|V_{th}|)^2=K(VDD-V_{data}-VDD+|V_{th}|-|V_{th}|)^2=K(V_{data})^2$, wherein $V_{sg}$ is the gate-source voltage of the driving transistor T2, $V_{th}$ is the threshold voltage of the driving transistor T2, it can be known from the above formula that the driving current flowing through the driving transistor T2 is independent of the threshold voltage $V_{th}$ of the driving transistor T2, thereby preventing the driving current flowing through the OLED D1 from being affected by non-uniformity and drift of the threshold voltage $V_{th}$; and simultaneously, the driving current flowing through the driving transistor T2 is also independent of the self-start voltage $V_{th-oled}$ of the OLED D1, thereby preventing the driving current from being affected by rise of the self-start voltage $V_{th-oled}$ of the OLED D1 and further improving the uniformity of the driving current flowing through the OLED D1. The driving transistor T2 provides the driving current for the OLED D1, and the driving transistor T2 provides the driving current for the OLED D1 according to the voltage value of the storage capacitor Cst.

Of course, it should be understood that examples in the above description are as follows: the voltage VDD of the first power supply is at a high level, the voltage VSS of the second power supply is at a low level, and all the switching tubes are P type TFTs, but if the voltages of the two power supplies are changed and the type of part or all of the TFTs is changed (for example. N type TFTs are used), those skilled in the art may change the specific circuit structure and the driving voltage according to the spirit of the embodiment to achieve the present invention.

According to the touch display driving circuit provided by the embodiment, the touch display driving circuit comprises the data writing control unit, the storage unit, the touch sensing unit, the driving compensation control unit, the driving unit, the light-emitting control unit and the light-emitting unit, wherein the data writing control unit is used for controlling a voltage signal of the data line to be written into the storage unit; the storage unit is used for providing the voltage for the driving unit; the light-emitting control unit is used for controlling the light-emitting unit to emit light; the driving unit is used for providing the touch detecting current in the touch detecting stage and providing the driving current for the light-emitting unit in the light-emitting stage; the driving compensation control unit is used for compensating the voltage value of the storage unit; and the touch sensing unit is used for outputting the touch detecting current in the touch detecting stage and changing the voltage value of the storage unit When no touch occurs in the touch detecting stage, and the touch display driving circuit may realize integration of touch detection and pixel display and reduce the thickness of a display screen.

It should be noted that, in the embodiment of the present invention, in each of the first switching tube T1, the third switching tube T3, the fourth switching tube T4, the fifth switching tube T5, the sixth switching tube T6, the seventh switching tube T7 and the driving transistor T2, the first electrode and the second electrode serve as the source and drain. In each transistor, the first electrode and the second electrode have the same structure. In actual applications, for a transistor, according to its position and function in a circuit, the first electrode may serve as the source, and correspondingly the second electrode may serve as the drain; or the first electrode may serve as the drain, and correspondingly the second electrode may serve as the source.

The embodiment of the present invention further provides a display device, which comprises the touch display driving circuit described in the above embodiment, and whose specific implementation can refer to the above embodiment, and is not described specifically here.

The display device provided by the embodiment of the present invention comprises a touch display driving circuit, the touch display driving circuit comprises the data writing control unit, the storage unit, the touch sensing unit, the driving compensation control unit, the driving unit, the light-emitting control unit and the light-emitting unit, wherein the data writing control unit is used for controlling the voltage signal of the data line to be written into the storage unit; the storage unit is used for providing the voltage for the driving unit; the light-emitting control unit is used for controlling the light-emitting unit to emit light; the driving unit is used for providing the touch detecting current in the touch detecting stage and providing the driving current of the light-emitting unit in the light-emitting stage; the driving compensation control unit is used for compensating the voltage value of the storage unit; and the touch sensing unit is used for outputting the touch detecting current in the touch detecting stage and changing the voltage value of the storage unit when no touch occurs in the touch detecting stage, and the touch display driving circuit may realize integration of touch detection and pixel display and reduce the thickness of the display screen.

The embodiment of the present invention further provides a touch display driving method, which is based on the touch display driving circuit in the above embodiment, and the touch display driving circuit comprises the data writing control unit, the storage unit, the touch sensing unit, the driving compensation control unit, the driving unit, the light-emitting control unit and the light-emitting unit.

In the embodiment, the touch display driving method comprises:

step S101, a touch detecting stage: initializing the storage unit by the driving compensation control unit; writing a voltage signal of a data line into the storage unit by the data writing control unit; disconnecting the light-emitting unit from the driving unit by the light-emitting control unit, changing a voltage of the storage unit by the touch sensing unit when no touch occurs, providing a touch detecting current by the driving unit according to a voltage value of the storage unit and outputting the touch detecting current by the touch sensing unit; and step S102, a light-canning stage: initializing the storage unit by the driving compensation control unit; writing the voltage signal of the data line into the storage unit by the data writing control unit; connecting the light-emitting unit with the driving unit by the light-emitting control unit, and providing a driving current for the light-emitting unit by the driving unit according to the voltage value of the storage unit, at this time, no matter whether a touch occurs, the touch sensing unit does not change the voltage of the storage unit and does not allow the touch detecting current to be output.

Specifically, if the data writing control unit comprises a sixth switching tube, a first electrode of the sixth switching tube is connected with the data line, and a second electrode of the sixth switching tube is connected with a second node; the storage unit comprises a storage capacitor, a first end of the storage capacitor is connected with the second node, and a second end of the storage capacitor is connected with a first node; the driving unit comprises a driving transistor, a gate of the driving transistor is connected with the first node, a first electrode of the driving transistor is connected with a third node, a second electrode of the driving transistor is connected with a fourth node; the light-emitting control unit comprises a first switching tube, a first electrode of the first switching tube is connected with the fourth node, and a second electrode of the first switching tube is connected with a fifth node; the light-emitting unit comprises an OLED, one end of the OLED is connected with the fifth node, and the other end of the OLED is connected with a second power supply; the driving compensation control unit comprises a fourth switching tube and a seventh switching tube; a first electrode of the fourth switching tube is connected with the first node, and a second electrode of the fourth switching tube is connected with the fourth node; a first electrode of the seventh switching tube is connected with the second node, and a second electrode of the seventh switching tube is connected with the second power supply; the touch sensing unit comprises a photoelectric diode, a third switching tube and a fifth switching tube; a first electrode of the photoelectric diode is connected with a first power supply and the third node, and a second electrode of the photoelectric diode is connected with the first electrode of the fifth switching tube; the second electrode of the fifth switching tube is connected with the first node; and a first electrode of the third switching tube is connected with the fourth node, and a second electrode of the third switching tube is connected with a reading line.

The touch detecting stage specifically comprises:

a touch sensing initialization phase: turning on the fourth switching tube and the seventh switching tube, charging the first end of the storage capacitor through the seventh switching tube by the second power supply, turning on the driving transistor, and charging the second end of the storage capacitor through the driving transistor and the fourth switching tube by the first power supply till the driving transistor is turned off;

a touch sensing and data writing phase: turning on the sixth switching tube, and writing the voltage signal of the data line into the second end of the storage capacitor through the first end of the storage capacitor and the storage capacitor; and a touch detecting phase: turning of the first switching tube, turning on the third switching tube and the fifth switching tube, reducing the voltage at the second end of the storage capacitor through the fifth switching tube by a leakage current of the photoelectric diode when no touch occurs, and reading out and detecting the current of the driving transistor through the third switching tube by the reading line. The light-emitting stage specifically comprises:

a driving display initialization phase: turning on the fourth switching tube and the seventh switching tube, charging the first end of the storage capacitor through the seventh switching tube by the second power supply, turning on the driving transistor, and charging the second end of the storage capacitor through the driving transistor and the fourth switching tube by the first power supply till the driving transistor is turned off;

a driving display and data writing phase: turning on the sixth switching tube, and writing the voltage signal of the data line into the second end of the storage capacitor through the first end of the storage capacitor and the storage capacitor; and a pixel display phase: turning on the firth switching tube, turning off the third switching tube and the fifth switching tube, and driving the OLED to emit light through the first switching tube by the current of the driving transistor.

More specifically, the gate of the sixth switching tube is connected with a scanning line; the gate of the first switching tube is connected with a third control line; the gate of the fourth switching tube and the gate of the seventh switching tube are connected with a second control line; the gate of the filth switching tube and the gate of the third switching tube are connected with the first control line; the first switching tube, the third switching tube, the fourth switching tube, the fifth switching tube, the sixth switching tube, the seventh switching tube and the driving transistor are P type TFTs; the first power supply is at a high level and the second power supply is at a low level.

The touch stage specifically comprises:

a touch sensing initialization phase; applying the high level to the scanning line, the data line, the first control line and the third control line, and applying the low level to the second control line;

a touch sensing and data writing phase: applying the high level to the first control line, the second control line and the third control line, and applying the low level to the scanning line and the data line; and a touch detecting stage phase: applying the high level to the scanning line, the data line, the second control line and the third control line, and applying the low level to the first control line.

The light-emitting stage specifically comprises:

a driving display initialization phase: applying the high level to the scanning line, the data line, the first control line and the third control line, and applying the low level to the second control line;

a driving display and data writing phase: applying the high level to the first control line, the second control line and the third control line, and applying the low level to the scanning line and the data line; and a pixel display phase: applying the high level to the scanning line, the data line, the first control line and the second control line, and applying the low level to the third control line.

The touch display driving method in the embodiment of the present invention may be implemented based on the touch display driving circuit in the above embodiment, and its specific implementation can refer to the above embodiment, and is not described specifically here.

According to the touch display driving method provided by the embodiment of the present invention, which is based on the touch display driving circuit comprising the data writing control unit, the storage unit, the touch sensing unit, the driving compensation control unit, the driving unit, the light-emitting control unit and the light-emitting unit, wherein the data writing control unit is used for controlling the voltage signal of the data line to be written into the storage unit; the storage unit is used for providing the voltage for the driving unit; the light-emitting control unit is used for controlling the light-emitting unit to emit light; the driving unit is used for providing the touch detecting current in the touch detecting stage and providing the driving current for the light-emitting unit in the light-emitting stage; the driving compensation control unit is used for compensating the voltage value of the storage unit; and the touch sensing unit is used for outputting the touch detecting current in the touch detecting stage and changing the voltage value of the storage unit when no touch occurs in the touch detecting stage, and the touch display driving method may realize integration of touch detection and pixel display and reduce the thickness of the display screen.

It can be understood that the above implementations are only exemplary implementations for describing the principle of the present invention, but the present invention is not limited thereto. Those skilled in the art may make various variations and improvements without departing from the spirit and the essence of the present invention, and these variations and the improvements are also considered to he within the protection scope of the present invention.

The invention claimed is:

1. A touch display driving circuit, comprising a data writing control unit, a storage unit, a touch sensing unit, a driving compensation control unit, a driving unit, a light-emitting control unit and a light-emitting unit, wherein the data writing control unit is used for controlling a voltage signal of a data line to be written into the storage unit;

the storage unit is used for providing a voltage for the driving unit;

the light-emitting control unit is used for controlling the light-emitting unit to emit light;

the driving unit is used for providing a touch detecting current in a touch detecting stage and providing a driving current for the light-emitting unit in a light-emitting stage;

the driving compensation control unit is used for compensating a voltage value of the storage unit; and the touch sensing unit is used for outputting the touch detecting current in the touch detecting stage and changing the voltage value of the storage unit when no touch occurs in the touch detecting stage, wherein the data writing control unit is connected with the storage unit through a second node; the storage unit is connected with the driving unit through a first node; the driving unit is connected with the light-emitting control unit through a fourth node; the light-emitting control unit is connected with the light-emitting unit through a fifth node; the driving compensation control unit is connected with both ends of the storage unit through the first node and the second node, respectively; the driving compensation control unit is connected with the driving unit through the first node and the fourth node, respectively; and the touch sensing unit is connected with the driving unit through a third node, the first node and the fourth node, respectively.

2. The touch display driving circuit according to claim 1, wherein the data writing control unit comprises a sixth switching tube, a gate of the sixth switching tube is connected with a scanning line, a first electrode of the sixth switching tube is connected with the data line, and a second electrode of the sixth switching tube is connected with the second node.

3. The touch display driving circuit according to claim 1, wherein the storage unit comprises a storage capacitor, the first end of the storage capacitor is connected with the second node, and the second end of the storage capacitor is connected with the first node.

4. The touch display driving circuit according to claim 1, wherein
the driving unit comprises a driving transistor, the gate of the driving transistor is connected with the first node, a first electrode of the driving transistor is connected with the third node, and a second electrode of the driving transistor is connected with the fourth node.

5. The touch display driving circuit according to claim 1, wherein
the light-emitting control unit comprises a first switching tube, a gate of the first switching tube is connected with a third control line, a first electrode of the first switching tube is connected with the fourth node, and a second electrode of the first switching tube is connected with the fifth node.

6. The touch display driving circuit according to claim 1, wherein
the light-emitting unit comprises an organic light-emitting diode, one end of the organic light-emitting diode is connected with the fifth node, and the other end of the organic light emitting diode is connected with a second power supply.

7. The touch display driving circuit according to claim 1, wherein
the driving compensation control unit comprises a fourth switching tube and a seventh switching tube; a gate of the fourth switching tube is connected with a second control line, a first electrode of the fourth switching tube is connected with the first node, and a second electrode of the fourth switching tube is connected with the fourth node; and a gate of the seventh switching tube is connected with the second control line, a first electrode of the seventh switching tube is connected with the second node, and a second electrode of the seventh switching tube is connected with a second power supply.

8. The touch display driving circuit according to claim 1, wherein
the touch sensing unit comprises a photoelectric diode, a third switching tube and a fifth switching tube;
a first electrode of the photoelectric diode is connected with a first power supply and the third node, and a second electrode of the photoelectric diode is connected with the first electrode of the fifth switching tube;
a gate of the fifth switching tube is connected with a first control line, and a second electrode of the fifth switching tube is connected with the first node; and
a gate of the third switching tube is connected with the first control line, a first electrode of the third switching tube is connected with the fourth node, and a second electrode of the third switching tube is connected with a reading line.

9. A display device, comprising a touch display driving circuit comprising a data writing control unit, a storage unit, a touch sensing unit, a driving compensation control unit, a driving unit, a light-emitting control unit and a light-emitting unit, wherein
the data writing control unit is used for controlling a voltage signal of a data line to be written into the storage unit;
the storage unit is used for providing a voltage for the driving unit;
the light-emitting control unit is used for controlling the light-emitting unit to emit light;
the driving unit is used for providing a touch detecting current in a touch detecting stage and providing a driving current for the light-emitting unit in a light-emitting stage;
the driving compensation control unit is used for compensating a voltage value of the storage unit; and
the touch sensing unit is used for outputting the touch detecting current in the touch detecting stage and changing the voltage value of the storage unit when no touch occurs in the touch detecting stage,
wherein the data writing control unit is connected with the storage unit through a second node; the storage unit is connected with the driving unit through a first node; the driving unit is connected with the light-emitting control unit through a fourth node; the light-emitting control unit is connected with the light-emitting unit through a fifth node; the driving compensation control unit is connected with both ends of the storage unit through the first node and the second node, respectively; the driving compensation control unit is connected with the driving unit through the first node and the fourth node, respectively; and the touch sensing unit is connected with the driving unit through a third node, the first node and the fourth node, respectively.

10. A touch display driving method, which is based on a touch display driving circuit comprising a data writing control unit, a storage unit, a touch sensing unit, a driving compensation control unit, a driving unit, a light-emitting control unit and a light-emitting unit;
the touch display driving method comprises:
a touch detecting stage: initializing the storage unit by the driving compensation control unit; writing a voltage signal of a data line into the storage unit by the data writing control unit; disconnecting the light-emitting unit from the driving unit by the light-emitting control unit, changing a voltage of the storage unit by the touch sensing unit when no touch occurs, providing a touch detecting current by the driving unit according to a voltage value of the storage unit and outputting the touch detecting current by the touch sensing unit; and
a light-emitting stage: initializing the storage unit by the driving compensation control unit; writing the voltage signal of the data line into the storage unit by the data writing control unit; and connecting the light-emitting unit with the driving unit by the light-emitting control unit, and providing a driving current for the light-emitting unit by the driving unit according to the voltage value of the storage unit,
wherein the data writing control unit is connected with the storage unit through a second node; the storage unit is connected with the driving unit through a first node; the driving unit is connected with the light-emitting control unit through a fourth node; the light-emitting control unit is connected with the light-emitting unit through a fifth node; the driving compensation control unit is connected with both ends of the storage unit through the first node and the second node, respectively; the driving compensation control unit is connected with the driving unit through the first node and the fourth node, respectively; and the touch sensing unit is connected with the driving unit through a third node, the first node and the fourth node, respectively.

11. The touch display driving method according to claim 10, wherein the data writing control unit comprises a sixth switching tube, a first electrode of the sixth switching tube is connected with the data line, and a second electrode of the sixth switching tube is connected with a second node;

the storage unit comprises a storage capacitor, a first end of the storage capacitor is connected with the second node, and a second end of the storage capacitor is connected with a first node;

the driving unit comprises a driving transistor, a gate of the driving transistor is connected with the first node, a first electrode of the driving transistor is connected with a third node, and a second electrode of the driving transistor is connected with a fourth node;

the light-emitting control unit comprises a first switching tube, a first electrode of the first switching tube is connected with the fourth node, and a second electrode of the first switching tube is connected with a fifth node;

the light-emitting unit comprises an organic light-emitting diode, one end of the organic light-emitting diode is connected with the fifth node, and the other end of the organic light emitting diode is connected with a second power supply;

the driving compensation control unit comprises a fourth switching tube and a seventh switching tube; a first electrode of the fourth switching tube is connected with the first node, and a second electrode of the fourth switching tube is connected with the fourth node; and a first electrode of the seventh switching tube is connected with the second node, and a second electrode of the seventh switching tube is connected with the second power supply;

the touch sensing unit comprises a photoelectric diode, a third switching tube and a fifth switching tube; a first electrode of the photoelectric diode is connected with a first power supply and the third node, and a second electrode of the photoelectric diode is connected with the first electrode of the fifth switching tube; a second electrode of the fifth switching tube is connected with the first node; and a first electrode of the third switching tube is connected with the fourth node, and a second electrode of the third switching tube is connected with a reading line;

the touch detecting stage specifically comprises:

a touch sensing initialization phase: turning on the fourth switching tube and the seventh switching tube, charging the first end of the storage capacitor through the seventh switching tube by the second power supply, turning on the driving transistor, and charging the second end of the storage capacitor through the driving transistor and the fourth switching tube by the first power supply till the driving transistor is turned off;

a touch sensing and data writing phase: turning on the sixth switching tube, and writing the voltage signal of the data line into the second end of the storage capacitor through the first end of the storage capacitor and the storage capacitor; and a touch detecting phase: turning off the first switching tube, turning on the third switching tube and the fifth switching tube, reducing the voltage at the second end of the storage capacitor through the fifth switching tube by a leakage current of the photoelectric diode when no touch occurs, and reading out and detecting the current of the driving transistor through the third switching tube by the reading line;

the light-emitting stage specifically comprises:

a driving display initialization phase: turning on the fourth switching tube and the seventh switching tube, charging the first end of the storage capacitor through the seventh switching tube by the second power supply, turning on the driving transistor, and charging the second end of the storage capacitor through the driving transistor and the fourth switching tube by the first power supply till the driving transistor is turned off;

a driving display and data writing phase: turning on the sixth switching tube, and writing the voltage signal of the data line into the second end of the storage capacitor through the first end of the storage capacitor and the storage capacitor; and a pixel display phase: turning on the firth switching tube, turning off the third switching tube and the fifth switching tube, and driving the organic light-emitting diode to emit light through the first switching tube by the current of the driving transistor.

12. The touch display driving method according to claim 11, wherein a gate of the sixth switching tube is connected with a scanning line;

a gate of the first switching tube is connected with a third control line;

a gate of the fourth switching tube and a gate of the seventh switching tube are connected with a second control line;

a gate of the fifth switching tube and a gate of the third switching tube are connected with a first control line;

the first switching tube, the third switching tube, the fourth switching tube, the fifth switching tube, the sixth switching tube, the seventh switching tube and the driving transistor are P type thin-film transistors;

the first power supply is at a high level, and the second power supply is at a low level;

the touch detecting stage specifically comprises:

the touch sensing initialization phase: applying a high level to the scanning line, the data line, the first control line and the third control line, and applying a low level to the second control line;

the touch sensing and data writing phase: applying a high level to the first control line, the second control line and the third control line, and applying a low level to the scanning line and the data line; and the touch detecting phase: applying a high level to the scanning line, the data line, the second control line and the third control line, and applying a low level to the first control line;

the light-emitting stage specifically comprises:

the driving display initialization phase: applying a high level to the scanning line, the data line, the first control line and the third control line, and applying a low level to the second control line;

the driving display and data writing phase: applying a high level to the first control line, the second control line and the third control line, and applying a low level to the scanning line and the data line; and the pixel display phase: applying a high level to the scanning line, the data line, the first control line and the second control line, and applying a low level to the third control line.

13. The display device according to claim 9, wherein the data writing control unit comprises a sixth switching tube, a gate of the sixth switching tube is connected with a scanning line, a first electrode of the sixth switching tube is connected with the data line, and a second electrode of the sixth switching tube is connected with the second node.

14. The display device according to claim 9, wherein the storage unit comprises a storage capacitor, the first end of the storage capacitor is connected with the second node, and the second end of the storage capacitor is connected with the first node.

15. The display device according to claim 9, wherein the driving unit comprises a driving transistor, the gate of the driving transistor is connected with the first node, a first electrode of the driving transistor is connected with the third node, and a second electrode of the driving transistor is connected with the fourth node.

16. The display device according to claim 9, wherein the light-emitting control unit comprises a first switching tube, a gate of the first switching tube is connected with a third control line, a first electrode of the first switching tube is connected with the fourth node, and a second electrode of the first switching tube is connected with the fifth node.

17. The display device according to claim 9, wherein the light-emitting unit comprises an organic light-emitting diode, one end of the organic light-emitting diode is connected with the fifth node, and the other end of the organic light-emitting diode is connected with a second power supply.

18. The display device according to claim 9, wherein the driving compensation control unit comprises a fourth switching tube and a seventh switching tube; a gate of the fourth switching tube is connected with a second control line, a first electrode of the fourth switching tube is connected with the first node, and a second electrode of the fourth switching tube is connected with the fourth node; and a gate of the seventh switching tube is connected with the second control line, a first electrode of the seventh switching tube is connected with the second node, and a second electrode of the seventh switching tube is connected with a second power supply.

* * * * *